United States Patent [19]
Brewis

[11] Patent Number: 5,699,195
[45] Date of Patent: Dec. 16, 1997

[54] PROJECTION LENS ARRANGEMENT AND METHOD OF USING SAME

[75] Inventor: Graham H. Brewis, Oceanside, Calif.

[73] Assignee: Proxima Corporation, San Diego, Calif.

[21] Appl. No.: 660,250

[22] Filed: Jun. 7, 1996

[51] Int. Cl.[6] .................................................. G02B 13/18
[52] U.S. Cl. ........................ 359/649; 359/708; 359/713
[58] Field of Search ........................... 359/708, 713, 359/714, 649, 650, 739, 740, 676, 677

[56] References Cited

U.S. PATENT DOCUMENTS

| | | | |
|---|---|---|---|
| Re. 35,310 | 8/1996 | Moskovich | 359/649 |
| 4,285,579 | 8/1981 | Yamada | 359/739 |
| 4,394,073 | 7/1983 | Wakamiya | 359/739 |
| 4,674,844 | 6/1987 | Nishioka et al. | 359/708 |
| 4,900,139 | 2/1990 | Kreitzer | 359/649 |
| 4,963,007 | 10/1990 | Moskovich | 359/649 |

*Primary Examiner*—Hoa Q. Pham
*Attorney, Agent, or Firm*—Bernard L. Kleinke; Peter P. Scott

[57] ABSTRACT

The projection lens arrangement includes a projection lens assembly having a plurality of lens elements aligned in a common optical path, and arranged in a generally Tessar configuration. One of the lens elements is movable along the optical path in a linear fashion. Another one of the lens elements is movable along the optical path in a non-linear manner, wherein the two lens elements move along the optical path substantially concurrently. The movement of the non-linearly moving element is slaved to the movement of the linearly moving element. A field lens element directs the flux from an image display unit to the entrance pupil of the projection lens assembly.

18 Claims, 4 Drawing Sheets

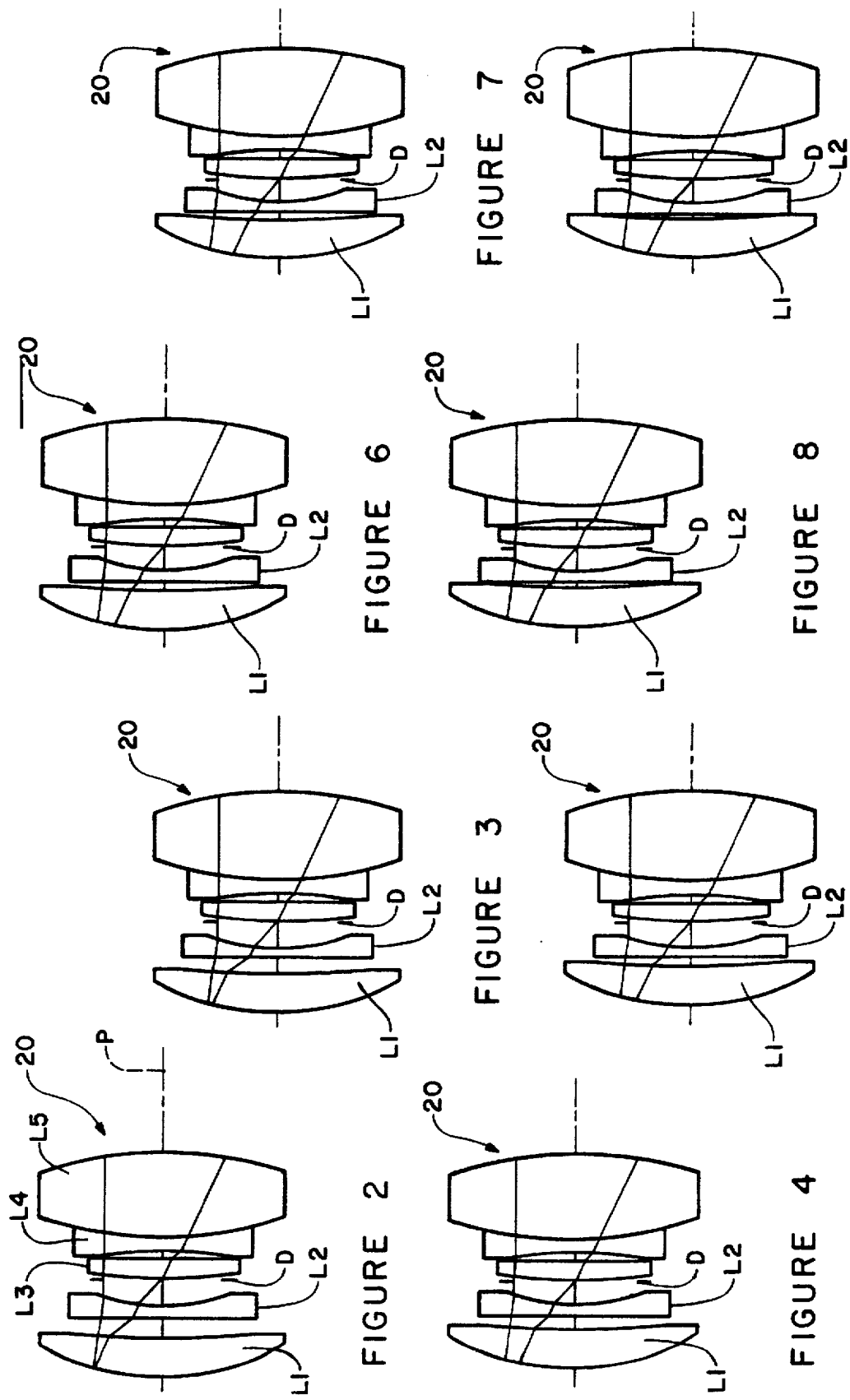

PROJECTION LENS ARRANGEMENT AND METHOD OF USING SAME

CROSS-REFERENCE TO RELATED APPLICATIONS

This patent application is related to co-pending U.S. patent application, entitled "DISPLAY PANEL PROJECTOR AND METHOD OF USING SAME," filed, Jun. 7, 1996, Ser. No. 08/655,208, which is incorporated herein by reference as if fully set forth herein.

TECHNICAL FIELD

The present invention relates in general to an improved lens arrangement and method of using it. The invention more particularly relates to a projection lens arrangement for projecting an image.

BACKGROUND ART

The use of projection lens arrangements for projecting images are well-known. For example, such projection lens arrangements have been used in conjunction with overhead projectors, slide projectors and motion picture video projectors.

More recently, projection lens arrangements have been developed for use with compact liquid crystal display projectors having liquid crystal display panels therein, such as the compact projector disclosed in U.S. Pat. No. 5,321,450, which is incorporated by reference as if fully set forth herein. Due to the size of the compact projector, the projection lens arrangement must accommodate the relatively short object conjugate distance associated with the projector.

In order to accommodate the short object conjugate distance of compact projectors, a projection lens arrangement having a relatively small variable vertex length and object conjugate distance was developed. Such a projection lens arrangement is disclosed in U.S. Pat. No. 5,483,382, which is incorporated by reference as if fully set forth herein.

The projection lens arrangement described in U.S. Pat. No. 5,483,382 operated satisfactorily for early generations of compact projectors. However, subsequent technological advances enabled the overall size of the compact projectors to be further reduced.

As the projection lens arrangement was contained within the compact projector, the overall size of the compact projector was dependent upon the size of the projection lens arrangement. Therefore, it would be highly desirable to have a new and improved projection lens arrangement which is relatively small in size to enable the overall size of a compact projector to be reduced even further. Such a projection lens arrangement should project an image with relatively low distortion over an entire given throw range.

Moreover, it would be desirable to utilize the projection lens arrangement at a different mechanical axis relative to the mechanical axis of the liquid crystal display panel. With such an off-axis mechanical configuration, the LCD image is projected onto a viewing surface above the liquid crystal display panel for more convenient viewing by a group of people. By having a compact configuration and a somewhat wide angle lens requirement, such as a half angle equal to 37°, it is difficult to obtain such a compact lens with sufficient coverage in a completely mechanical off-axis but optically centered arrangement, with a relatively large liquid crystal display panel. At the same time, distortion must be reasonably corrected throughout the throw range.

DISCLOSURE OF INVENTION

Therefore, the principal object of the present invention is to provide a new and improved projection lens arrangement, and method of using the projection lens arrangement, which can be used in a relatively small, compact projector. Another object of the present invention is to provide such a new and improved projection lens arrangement that is relatively small in size, yet enables an image to be projected with relatively low distortion over an entire given throw range.

Briefly, the above and further objects of the present invention are realized by providing a new and improved projector lens arrangement which is relatively small in size, and which projects an image substantially distortion free according to a novel method of the present invention.

The projection lens arrangement includes a projection lens assembly having a plurality of lens elements aligned in a common optical path, and arranged in a generally Tessar configuration. One of the lens elements is movable along the optical path in a linear fashion. Another one of the lens elements is movable along the optical path in a non-linear manner, wherein the two lens elements move along the optical path substantially concurrently. The movement of the non-linearly moving lens element is slaved to the movement of the linearly moving lens element. A field lens element directs the flux from an image display unit to the entrance pupil of the projection lens assembly.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIGS. 2–9 are diagrammatic views of the sequential operation of a projection lens assembly of FIG. 1 through the throw range from near to far focus;

BEST MODE FOR CARRYING OUT THE INVENTION

Figure 1:
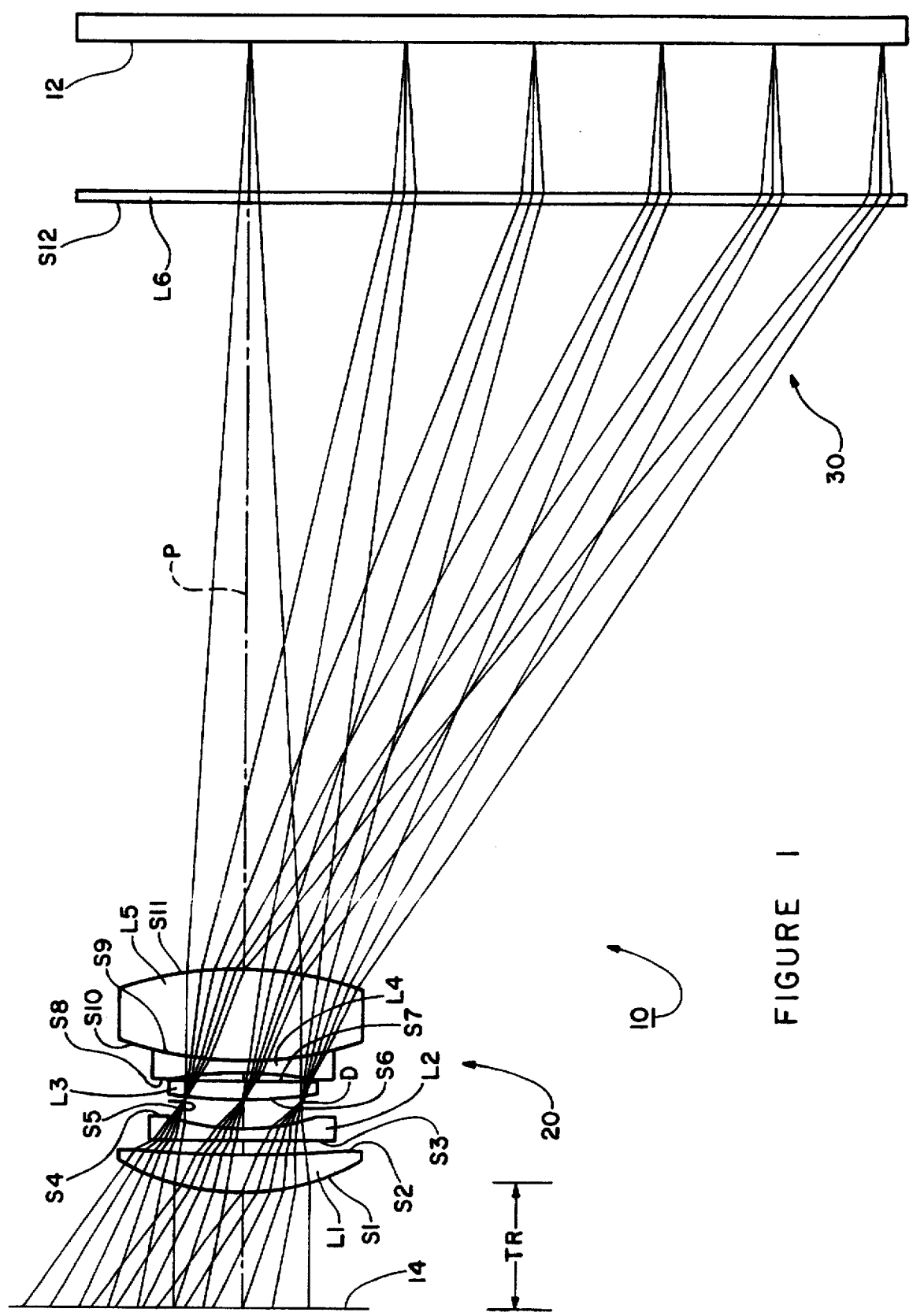
FIG. 1 is a diagrammatic view of a projection lens arrangement which is constructed in accordance with the present invention.

Referring now to the drawings, and more particularly to FIGS. 1–9 thereof, there is shown a projection lens arrangement 10 which is constructed in accordance with the present invention. The projection lens arrangement 10 cooperates with a liquid crystal projector 12 in an off-axis configuration, and in accordance with the method of the present invention, causes the LCD image generated by the liquid crystal display 12 to be displayed on a remote viewing surface, such as a surface 14.

The projection lens arrangement 10 generally comprises six lens elements arranged in five groups. In this regard, the arrangement 10 includes a projection lens assembly 20 having five lens elements L1, L2, L3, L4 and L5 configured in a generally Tessar configuration. The lens elements L1, L2, L3, L4 and L5 are aligned along a common optical path P, and are arranged sequentially from the image end of the projection lens assembly 20 to the object end thereof.

A diaphragm or stop D is disposed between the lens element L2 and the lens element L3.

To facilitate the projection of the LCD image onto the surface 14 as the screen image with relatively little or no distortion, the lens element L1 and L2 are movable along the common optical path P. In this regard, the lens element L1 is movable in a linear manner, while the movement of lens element L2 is slaved to the movement of L1 movable in a non-linear manner. The LCD image is projected by the projection lens assembly 20 over a throw range TR, and onto the screen 14. As will be described hereinafter in greater detail, the throw range TR may be varied to accommodate the environment, wherein the throw range TR varies between about 1.3 meters and about 4.1 meters.

A sixth lens element L6 acts as a pupil relay or field lens element and is disposed in the common optical path P between the liquid crystal display 12 and the projection lens assembly 20. The field lens element L6 is mechanically offset from the optical path P, but optically centered thereon, and acts to make the entrance pupil of the objective telecentric. The LCD image generated by the liquid crystal display 12 is focused by the field lens element L6 onto the projection lens assembly 20 for projecting the image over the throw range TR onto the surface 14.

Each of the lens elements L1, L2, L3 and L6 individually define a single lens group. However, lens elements L4 and L5 cooperate to define another lens group.

In operation, the lens elements L1 and L2 are moved substantially concurrently with one another to allow focusing for varying throw ranges TR. The remaining lens elements L3, L4 and L5 of the projection lens assembly 20 remain fixed in place.

As shown in FIGS. 2–9, lens element L1 moves from a starting position in FIG. 2 for a near focus through intermediate positions shown in FIGS. 3–8, and reaches a final position as shown in FIG. 9 for a far focus. The lens element L1 travels from its initial position (FIG. 2) to its final position (FIG. 9) in a linear manner.

The lens element L2 also moves from an initial position shown in FIG. 2, through subsequent intermediate positions shown in FIGS. 3–8, until the lens element L2 reaches a final position as shown in FIG. 9. In its final position (FIG. 9), the lens element L2 is immediately adjacent to the lens element L1 in its final position (FIG. 9). Unlike the lens element L1 which travels in a linear manner, the lens element L2 travels in a non-linear manner.

As will be described in greater detail hereinafter, the lens element L2 defines a floating lens element. As a consequence, the movement of lens element L2 is slaved to the movement of lens element L1.

In the preferred embodiment of the invention, both lens elements L1 and L2 travel in the same direction along the optical path P when the two lens elements L1 and L2 are varied between their respective initial positions (FIG. 2) and final positions (FIG. 9). Due to the non-linear moving characteristics of the lens element L2, however, the distance traveled by the lens element L1 is not the same as the distance traveled by the lens element L2.

Figure 10:
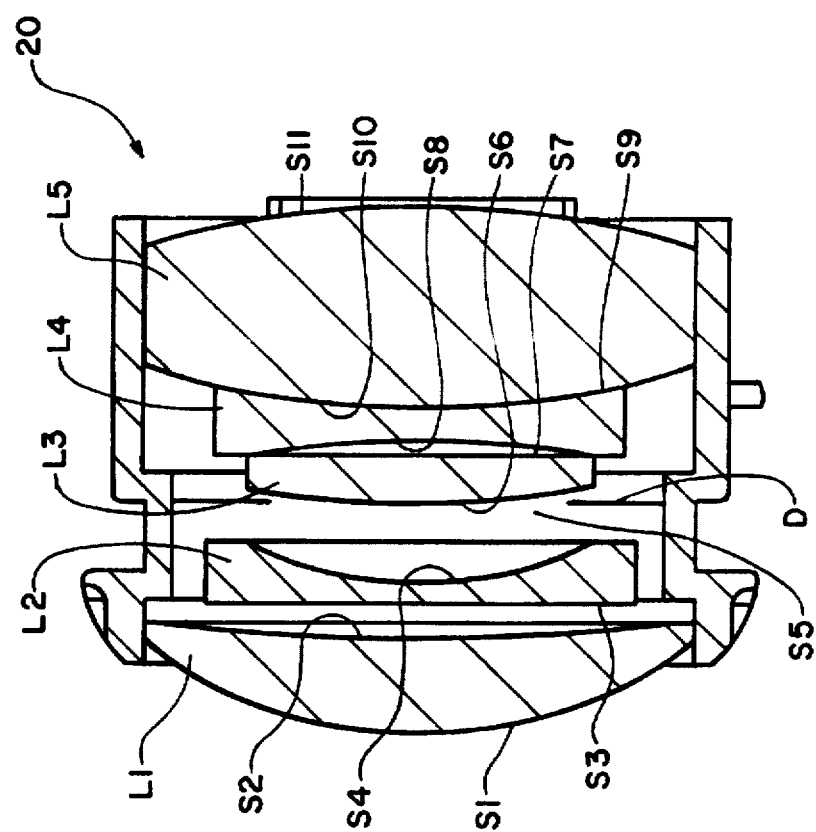
FIG. 10 is an elevational cross-sectional view of the projection lens assembly of FIG. 1.

Considering now the projection lens assembly 20 in greater detail with reference to FIGS. 1 and 10, the lens element L1 is a positive lens element to affect the focusing of the projected image. The lens element L1 includes a convex lens surface S1 and a concave lens surface S2.

The lens element L2 is a negative lens element for affecting the distortion, as well as focusing, of the projected image. The lens element L2 includes a convex lens surface S3 and a concave lens surface S4. The movable floating lens element L2 reasonably corrects for distortion throughout the throw range.

The opening defined by the stop D is indicative of another surface S5.

The lens element L3 is a positive lens element having a convex lens surface S6 and a concave lens surface S7 for facilitating color correction.

The lens element L4 is a negative biconcave lens element, and includes a concave lens surface S8 and a concave lens surface S9. The lens element L5 is biconvex and cooperates with the lens element L4 to define a doublet for enhancing color correction. In this regard, the lens element L5 includes a convex lens surface S10 and a lens surface S11, wherein lens surface S9 is generally complementary to the lens surface S10.

Considering now the field lens element L6 (FIG. 1) in greater detail, the lens element L6 includes a lens surface S12 for focusing an image produced by the liquid crystal display 12 onto the projection lens assembly 20. Preferably, the field lens element L6 is a fresnel lens.

The lens surface S12 is an aspheric surface, and the curvature of this surface is defined by the following equation:

$$Z = \frac{ch^2}{1 + \sqrt{1 - (1+k)c^2h^2}} + Ah^4 + Bh^6 + Ch^8 + Dh^{10} \quad (1)$$

where:

Z is the sag of the surface parallel to the Z axis;

c is the curvature at the vertex of the surface;

k is the conic constant;

A is the fourth order deformation coefficient;

B is the sixth order deformation coefficient;

C is the eighth order deformation coefficient;

D is the tenth order deformation coefficient; and $h^2 = X^2 + Y^2$.

Table I below describes an exemplary projection lens arrangement 20 embodying the present invention, and which is used for projecting an image generated by the liquid crystal display 12.

The numerical data indicative of the prescription for the projection lens arrangement 20 for eight focus positions is set forth in Table I, where r represents the radius of curvature of each lens surface S1–S12, d represents the spacing between adjacent lens surfaces S1–S12, n represents the refractive index of each lens element L1–L6, and v represents an Abbe number for each lens element L1–L6.

TABLE 1

| | | | | |
|---|---|---|---|---|
| r1 = 38.00 | d1 = 6.902461 | n1 = 1.74400 | v1 = 44.72 | L1 |
| r2 = 228.60 | d2 = 2.438290 | | | |
| r3 = 417.45 | d3 = 2.000000 | n2 = 1.74400 | v2 = 44.72 | L2 |
| r4 = 35.49 | d4 = 5.563986 | | | |
| r5 = 0.00 | d5 = 0.167690 | | | |
| r6 = 91.60 | d6 = 3.181673 | n3 = 1.75520 | v3 = 22.58 | L3 |
| r7 = 378.06 | d7 = 1.322511 | | | |
| r8 = −99.80 | d8 = 2.920215 | n4 = 1.75520 | v4 = 22.58 | L4 |

TABLE 1-continued

| r9 = 72.58 | d9 = 15.165019 | n5 = 1.65844 | v5 = 50.88 | L5 |
|---|---|---|---|---|
| r10 = −73.33 | d10 = 138.00 | | | |
| r11 = 0.00 | d11 = 2.00 | n6 = 1.491 | v6 = 61.38 | L6 |
| r12 = −76.33914 | d12 = 27.00 | | | |

Aspheric parameters of lens surface S12 k = −0.796023
A = 0.291669E−.07
B = 0.169810E−11
C = −0.197023E−16
D = 0.227359E−20

| | pos(1) pos(5) | pos(2) pos(6) | pos(3) pos(7) | pos(4) pos(8) |
|---|---|---|---|---|
| d0 | 1310.0 | 1500.0 | 2000.0 | 2500.0 |
| | 3000.0 | 3500.0 | 4000.0 | 4100.0 |
| d2 | 2.43829 | 2.08678 | 1.45648 | 1.08208 |
| | 0.83325 | 0.65608 | 0.52613 | 0.53906 |
| d4 | 5.56399 | 5.36378 | 4.96682 | 4.67310 |
| | 0.83325 | 4.34316 | 4.23455 | 4.18582 |
| efl | 163.219 | 162.007 | 159.901 | 158.693 |
| | 157.907 | 157.355 | 156.955 | 157.000 |
| f/# | 6.800 | 6.800 | 6.800 | 6.800 |
| | 6.800 | 6.800 | 6.800 | 6.800 |

Figure 11:
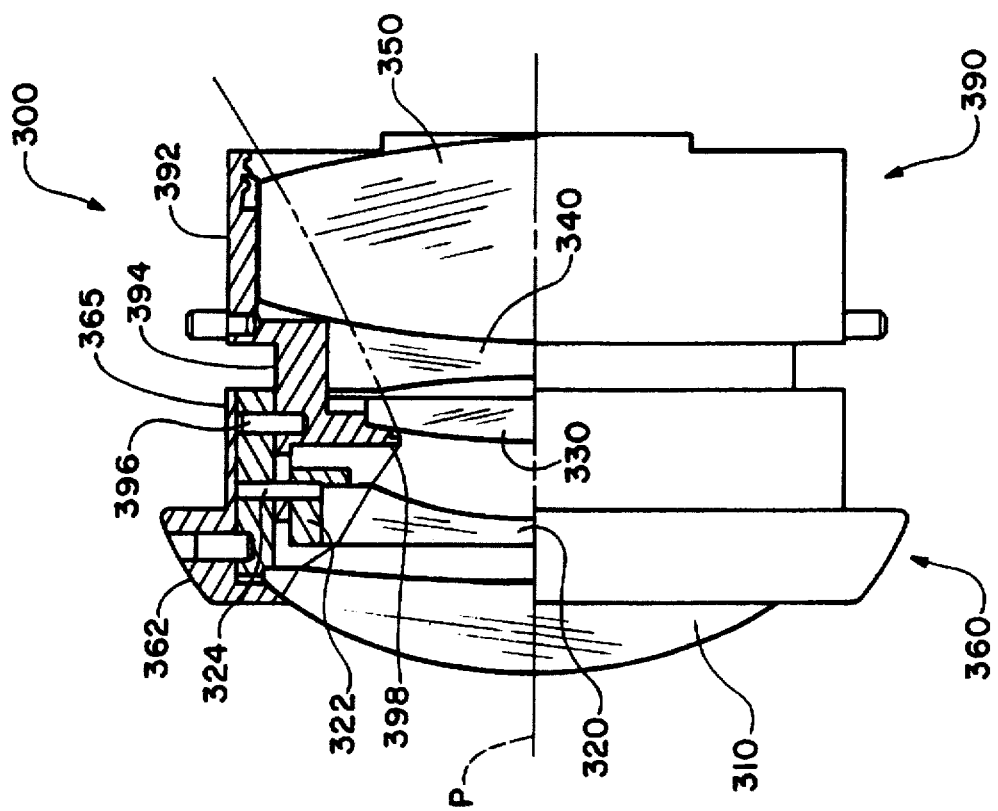
FIG. 11 is a partially cut-away view illustrating the mechanical assembly thereof.
Figure 13:
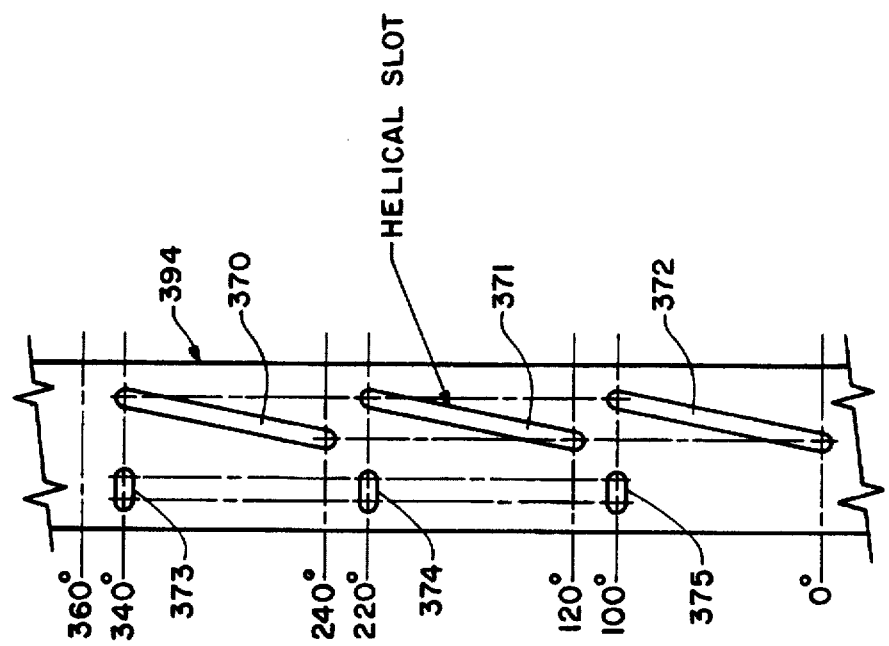
FIG. 13 is a developed diagrammatic view of another inner surface with the helical slots for the linearly moving element.
Figure 12:
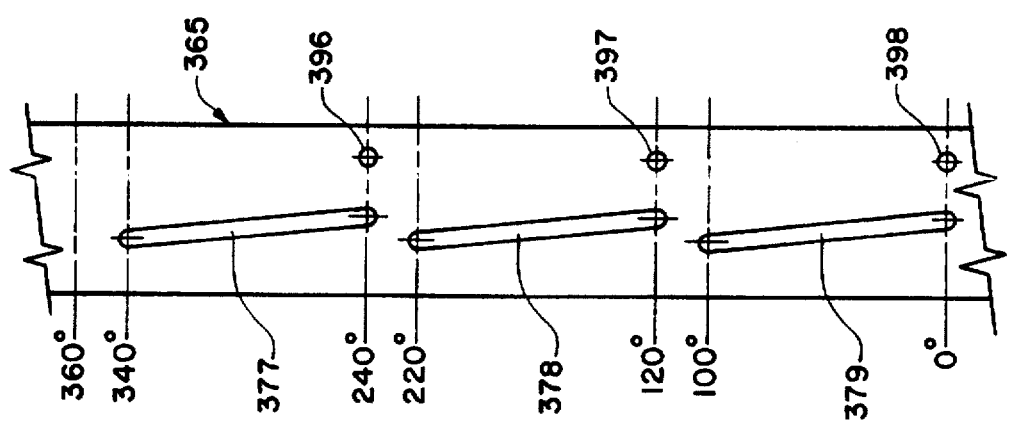
FIG. 12 is a developed diagrammatic view of an inner surface with the cam slots for the floating element of the projection lens assembly of FIG. 11.

Referring now to FIGS. 11–13, there is illustrated another projection lens assembly 300 which is also constructed in accordance with the present invention. The projection lens assembly 300 includes a movable housing 360 rotatably coupled to a fixed housing 390, wherein lens elements 310, 320, 330, 340, and 350 are supported therein. The lens elements 310, 320, 330, 340 and 350 are substantially similar to the lens elements L1, L2, L3, L4 and L5, respectively, of FIGS. 1–10, and will not be described in greater detail.

The fixed housing 390 includes a fixed barrel 392 which may be fixed to a compact liquid crystal display projector (not shown) to facilitate the projection of an image therefrom. The movable housing 360 includes a focusing bezel 362 secured to a cam ring 365 for cooperating with the fixed barrel 392 to help move the lens elements 310 and 320, wherein the lens element 310 moves in a linear manner along optical path P while the lens element 320 moves in a non-linear manner along optical path P. The lens element 310 is secured to the focusing bezel 362 and moves linearly axially along the optical path P as the focusing bezel 362 is rotated. As will be described hereinafter in greater detail, the lens element 320 is configured as a floating element, and moves simultaneously with the lens element 310 along the optical path P when the upper housing 360 is rotated relative to the lower housing 390.

Considering now the cam ring 365 in greater detail with reference to FIGS. 11 and 12, the cam ring 365 includes three focusing pins 396, 397 and 398 extending inwardly to engage the fixed barrel 392. The focusing pins 396, 397 and 398 are spaced about 120° apart from one another to stabilize the movable housing 360 relative to the fixed housing.

The cam ring 365 further includes three curved cam slots 377, 378 and 379 sized to permit the angle of rotation for the focusing bezel to be about 100°. One end of each slot 377, 378 and 379 is substantially aligned with a corresponding focusing pin 396, 397 and 398, respectively.

The fixed barrel 392 is generally arranged in a stepped wall configuration and helps secure the lens elements 330, 340 and 350 therein. The fixed barrel 392 includes a small diameter portion 394 which is received within the cam ring 365 to facilitate the coupling of the movable housing 360 with the fixed housing 390. A projecting portion 398 extends inwardly from the small diameter portion 394, between the lens elements 320 and 330, to define a stop.

Considering now the small diameter portion 394 in greater detail with reference to FIGS. 11 and 13, the small diameter portion 394 includes three helical slots 370, 371 and 372 and three guide slots 373, 374 and 375 disposed therein. The helical slots 370, 371 and 372 receive the focusing pins 396, 397 and 398 to enable the lens element 310 to move linearly axially along the optical path P as the focusing bezel 362 is rotated relative to the fixed barrel 392, wherein the pins 396, 397 and 398 travel within the slots 370, 371 and 372 to move the element 310 as the bezel 362 is rotated.

The lens element 320 is secured to a floating lens element mount 322 for cooperating cammingly with the cam ring 365 to enable the lens element 320 to move axially along the optical path P in a non-linear manner when the movable housing 360 is rotated. In this regard, three cam pins 324, 325 and 326 (pins 325 and 326 are not shown) are spaced about the perimeter of the floating lens element mount 322 at about 120° intervals. The cam pins 324, 325 and 326 extend outwardly from the floating lens element mount 322, pass through the guide slots 373, 374 and 375, and engage cammingly the cam slots 377, 378 and 379. Thus, the lens element 320 is not fixed to either the movable housing 360 or the fixed housing 390, and can move relative thereto as a floating element.

It will be understood by one skilled in the art that the number of cam slots, helical slots, focusing pins and cam pins can be as few as two and as many as four or more. In this way, the angle of rotation may be adjusted from the 100° described above.

In operation, the focusing bezel 362 is rotated to rotate simultaneously the cam ring 365. The lens element 310 moves in the direction of the optical path P linearly as the focusing pins 396, 397 and 398 travel cammingly in the helical slots 370, 371 and 372.

Simultaneously with the linear movement of the lens element 310, the cam pins 324, 325 and 326 travel cammingly within the curved cam slots 377, 378 and 379 to cause the lens element 320 to move non-linearly along the optical path P. The cam pins 324, 325 and 326 are free to move within the guide slots 373, 374 and 375 as the cam slots 377, 378 and 379 urge the cam pins 324, 325 and 326 to move, thereby enabling the lens element 320 to move non-linearly along the optical path P as a floating element.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A projection lens arrangement for an image projector having an offset image display unit to project an image, comprising:

a projection lens assembly including a plurality of lens elements in a common optical path arranged in a generally Tessar configuration arranged to receive an image from the image display unit;

said plurality of lens elements including a linearly movable lens element and a non-linearly movable lens element, wherein said linearly movable lens element and said non-linearly movable lens element are movable along said common optical path substantially concurrently to facilitate the substantially distortion free projection of the image for a given throw range; and a field lens element disposed in said common optical path between the image display unit and said projection lens assembly.

2. A projection lens arrangement according to claim 1, wherein said given throw range is between about 1.3 meters and about 4.1 meters.

3. A projection lens arrangement according to claim 1, wherein said non-linearly movable lens element is disposed between said field lens element and said linearly movable lens element.

4. A projection lens arrangement according to claim 3, wherein said non-linearly movable lens element defines a floating element.

5. A projection lens arrangement according to claim 3, wherein said field lens element is offset mechanically from said common optical path.

6. A projection lens arrangement according to claim 3, wherein said field lens element has an aspheric surface.

7. A projection lens arrangement according to claim 6, wherein said field lens element is a fresnel lens.

8. A projection lens arrangement according to claim 3, wherein said linearly movable lens element is a positive element having a convex surface and a concave surface.

9. A projection lens arrangement, according to claim 8, wherein said non-linearly movable lens element is a negative element having a convex surface and a concave surface.

10. A projection lens arrangement according to claim 9, further including a positive lens element disposed in said common optical path, said positive lens element having a convex surface and a concave surface to facilitate color correction.

11. A projection lens arrangement according to claim 10, further including a stop element disposed between said non-linearly movable lens element and said positive lens element.

12. A projection lens arrangement according to claim 10, further including a biconcave negative lens element coupled to a biconvex lens element to define an optical doublet, said doublet being disposed in said common optical path to enhance color correction.

13. A projection lens arrangement according to claim 12, described substantially as follows:

TABLE 1

| r1 = 38.00 | d1 = 6.902461 | n1 = 1.74400 | v1 = 44.72 | L1 |
|---|---|---|---|---|
| r2 = 228.60 | d2 = 2.438290 | | | |
| r3 = 417.45 | d3 = 2.000000 | n2 = 1.74400 | v2 = 44.72 | L2 |
| r4 = 35.49 | d4 = 5.563986 | | | |
| r5 = 0.00 | d5 = 0.167690 | | | |
| r6 = 91.60 | d6 = 3.181673 | n3 = 1.75520 | v3 = 22.58 | L3 |
| r7 = 378.06 | d7 = 1.322511 | | | |
| r8 = −99.80 | d8 = 2.920215 | n4 = 1.75520 | v4 = 22.58 | L4 |
| r9 = 72.58 | d9 = 15.165019 | n5 = 1.65844 | v5 = 50.88 | L5 |
| r10 = −73.33 | d10 = 138.00 | | | |

TABLE 1-continued

| r11 = 0.00 | d11 = 2.00 | n6 = 1.491 | v6 = 61.38 | L6 |
|---|---|---|---|---|
| r12 = −76.33914 | d12 = 27.00 | | | |

Aspheric parameters of lens surface S12 k = −0.796023
A = 0.291669E−.07
B = 0.169810E−11
C = −0.197023E−16
D = 0.227359E−20

| | pos(1) pos(5) | pos(2) pos(6) | pos(3) pos(7) | pos(4) pos(8) |
|---|---|---|---|---|
| d0 | 1310.0 | 1500.0 | 2000.0 | 2500.0 |
| | 3000.0 | 3500.0 | 4000.0 | 4100.0 |
| d2 | 2.43829 | 2.08678 | 1.45648 | 1.08208 |
| | 0.83325 | 0.65608 | 0.52613 | 0.53906 |
| d4 | 5.56399 | 5.36378 | 4.96682 | 4.67310 |
| | 0.83325 | 4.34316 | 4.23455 | 4.18582 |
| efl | 163.219 | 162.007 | 159.901 | 158.693 |
| | 157.907 | 157.355 | 156.955 | 157.000 |
| f/# | 6.800 | 6.800 | 6.800 | 6.800 |
| | 6.800 | 6.800 | 6.800 | 6.800 |

14. A method of projecting an image with a projection lens arrangement for an image projector having an offset image display unit, comprising:

using a projection lens assembly including a plurality of lens elements in a common optical path;

arranging said plurality of lens elements in a generally Tessar configuration;

moving linearly one of said lens elements and moving non-linearly another one of said lens elements for affecting image focusing in a substantially distortion free manner over a given throw range; and focusing light from the image display unit to said projection lens assembly with a field lens element disposed between the image display unit and said projection lens assembly.

15. A method according to claim 14, further including adjusting the throw range to be between about 1.3 meters and about 4.1 meters.

16. A method according to claim 14, further including disposing said non-linearly movable lens element between said field lens element and said linearly movable lens element.

17. A method according to claim 16, further including configuring said non-linearly movable lens element as a floating element.

18. A method according to claim 16, further including offsetting mechanically said field lens element from said common optical path.

* * * * *